(No Model.)
J. W. CARNS.
RAILWAY RAIL JOINT.
No. 305,374.　　　　　Patented Sept. 16, 1884.
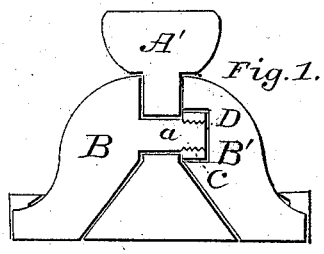
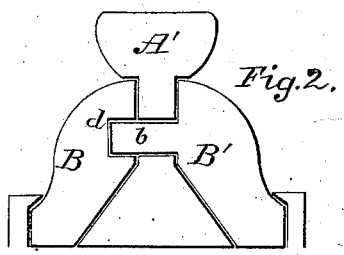
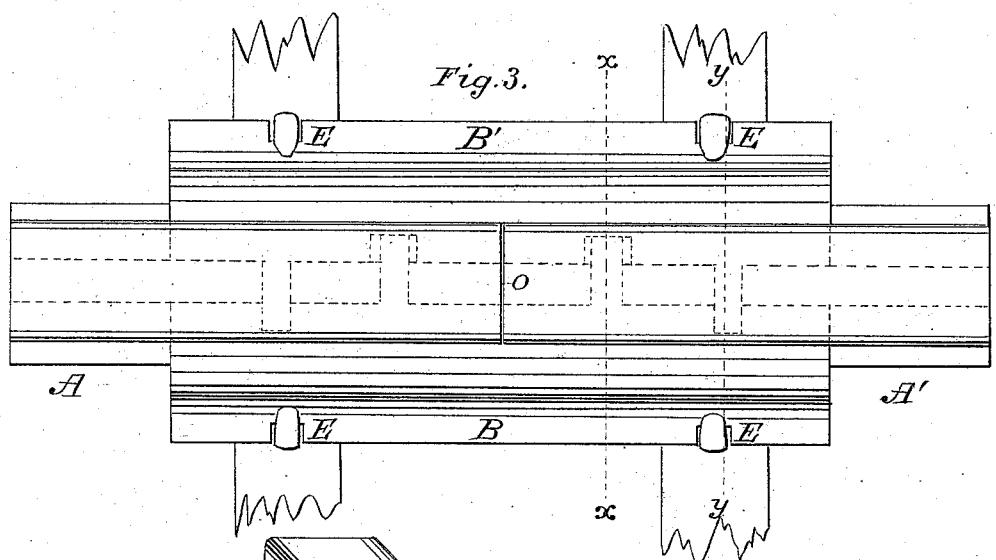
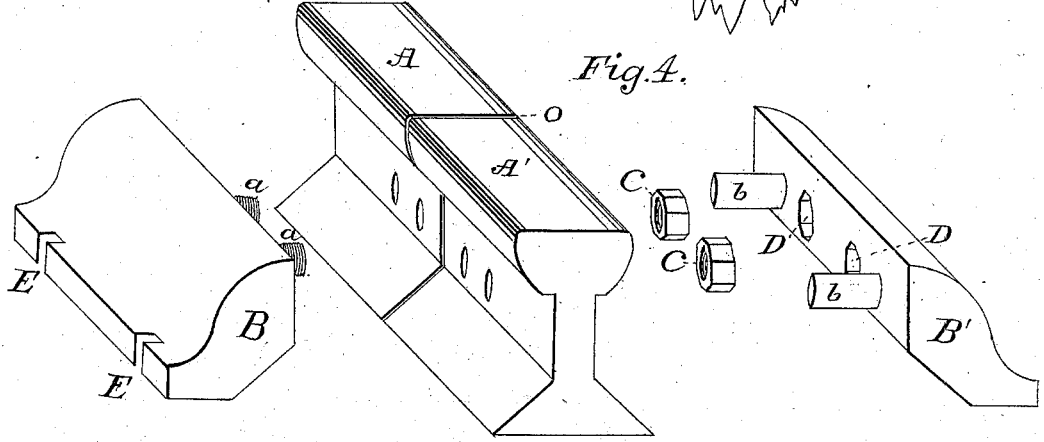
Witnesses:
C. C. Card
Wm. W. Brishin
Inventor:
John W. Carns
By Fred W. Bond
Atty

United States Patent Office.

JOHN W. CARNS, OF PIERCE, OHIO.

RAILWAY-RAIL JOINT.

SPECIFICATION forming part of Letters Patent No. 305,374, dated September 16, 1884.

Application filed January 2, 1884. (No model.)

*To all whom it may concern:*

Be it known that I, JOHN W. CARNS, a citizen of the United States, residing at Pierce, in the county of Stark and State of Ohio, have invented certain new and useful Improvements in Railway-Rail Joints; and I do hereby declare that the following is a full, clear, and exact description of the same, reference being had to the annexed drawings, making a part of this specification, and to the letters and figures of reference marked thereon, in which—

Figure 1 is a transverse view on line $x\,x$, Fig. 3; Fig. 2, a transverse view on line $y\,y$, Fig. 3. Fig. 3 is a top view showing the internal construction by dotted lines, and Fig. 4 a view showing the several parts detached.

Similar letters refer to like parts in the drawings.

My invention relates to improvements in railway-rail joints constructed substantially as shown in the drawings, and hereinafter described, and pointed out in the claims.

A A′ represent the ends of the ordinary railroad-rails meeting in the joint at $o$, Figs. 3 and 4.

B B′ represent my improved fish-plates or angle-bars, called in this specification "angle-bars." They are made of wrought or rolled iron, steel, or other equivalent material in the form shown in the drawings, and so as to fit the sides of the rails, and extending beyond the edges of the web or bottom of the rail on each side a distance sufficient to form a surface to rest on the cross-ties or sleepers. These angle-bars B B′ are provided with the bolts and pins $a\,b$, and are rigidly attached to said angle-bars. The bolts $a$ are provided with screw-threads, so that the nuts C may be attached. Recesses D are provided in the angle-bar B′, and are for the purpose of receiving the nuts C, and are to correspond in size and form to said nuts, but should be formed deep enough to admit the ends of the bolts $a$ in case they should extend a short distance through the nuts C. Recesses $d$ are formed in the angle-bar B, and are for the purpose of receiving the ends of the pins $b$, as seen in Fig. 2, said pins being for the purpose of assisting in holding the angle-bar B′ in proper position.

In using my invention the angle-bar B is first placed in proper position, when the nuts C are placed in position in the ordinary manner, after which the angle-bar B′ is placed in position.

The notches E are for the passage of ordinary railroad-spikes, to fasten the joint to the cross-ties or sleepers.

It will be seen that by my peculiar arrangements I am enabled to firmly join the ends of railway-rails, and at the same time so join them that the joint will not become loosened by the jar of passing trains, as the recesses D will prevent the nuts C from turning when they are placed in the position shown in Fig. 3.

I am aware that railway-rail joints have been made prior to my invention by the use of fish-plates, angle-irons, or bars of various forms, which were placed along the sides of the rails, and hence I do not claim, broadly, the use of angle irons or bars for joining railway-rails; but What I do claim as my invention, and desire to secure by Letters Patent, is the following:

1. The angle-bar B, provided with the bolts $a$, said bolts being rigidly attached to said angle-bar B, in combination with the nuts C and bar B′, provided with recesses D, substantially as and for the purpose specified.

2. The angle-bar B, provided with the rigidly-attached bolts $a$ and the recesses $d$, in combination with the nuts C, pins $b$, and the angle-bar B′, substantially as and for the purpose specified.

3. The angle-bar B′, provided with the recesses D, and the rigidly-attached pins $b$, in combination with the nuts C and angle-bar B, having recesses $d$, substantially as and for the purpose specified.

In testimony that I claim the above I have hereunto subscribed my name in presence of two witnesses.

JOHN W. CARNS.

Witnesses:
JOHN A. MACK,
FRED W. BOND.